United States Patent [19]
Kaitsuka

[11] 4,384,366
[45] May 17, 1983

[54] INTERFERENCE COMPENSATION SYSTEM

[75] Inventor: Toshiyuki Kaitsuka, Yokosuka, Japan

[73] Assignee: Nippon Telegraph & Tele. Public Corp., Tokyo, Japan

[21] Appl. No.: 248,464

[22] Filed: Mar. 27, 1981

[30] Foreign Application Priority Data

Mar. 28, 1980 [JP] Japan .................................. 55-39093
Dec. 13, 1980 [JP] Japan ................................ 55-175248

[51] Int. Cl.³ .......................... H04B 1/06; H04B 1/10
[52] U.S. Cl. .................................... 455/278; 455/139; 455/276
[58] Field of Search ............... 455/272, 273, 276, 278, 455/139; 343/100 CL, 100 LE

[56] References Cited

U.S. PATENT DOCUMENTS

| | | | |
|---|---|---|---|
| 4,075,566 | 2/1978 | D'Arcangelis | 455/276 |
| 4,160,952 | 7/1979 | Seastrand, Jr. | 455/276 |
| 4,236,158 | 11/1980 | Daniel | 343/100 LE |
| 4,320,535 | 3/1982 | Brady et al. | 455/278 |

FOREIGN PATENT DOCUMENTS 2042307 9/1980 United Kingdom ................ 455/278

OTHER PUBLICATIONS

"Applications of an Interference Cancellation Technique to Communications and Radar Systems", by Bristow, 9/79, No. 32.

*Primary Examiner*—Jin F. Ng
*Attorney, Agent, or Firm*—Ratner & Prestia

[57] ABSTRACT

An interference compensation system having a main antenna (1) which receives both the desired signal and the undesired interference signal $I_M$, an auxiliary antenna (2) which receives only the interference signal $I_A$, an amplitude-phase control circuit which modifies the amplitude and the phase of the interference signal $I_A$ from the auxiliary antenna (2) according to the control signals $A+a\cdot\cos\omega t$, and $B+a\cdot\sin\omega t$, to provide the output signal $I_{VM}$, and a combiner (4) which combines said signals $I_M$ and $I_{VM}$ to provide the output signal $I_E$ which is considered to be free from the interference signal except for the very little residual component of said interference signal, where A and B change according to the difference between $I_M$ and $I_A$, (a) and ($\omega$) are amplitude and angular frequency of the output of the low frequency oscillator (7).

8 Claims, 26 Drawing Figures

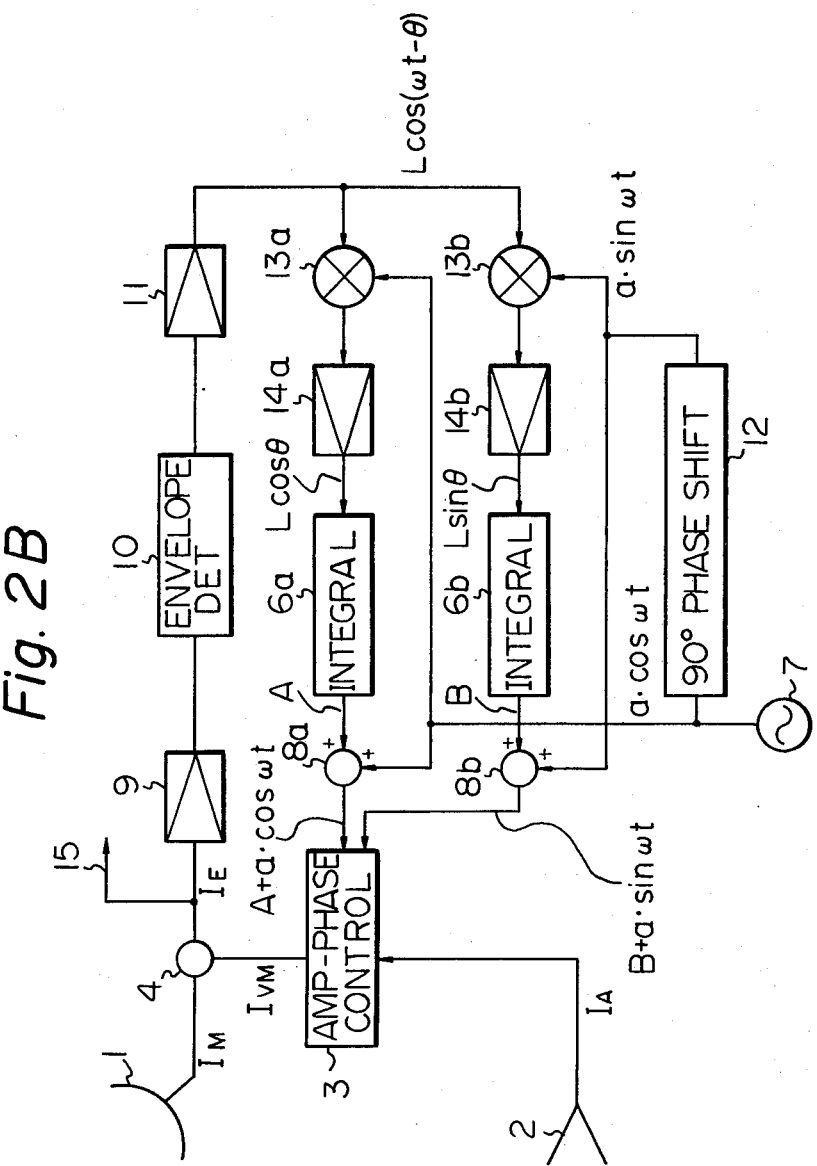

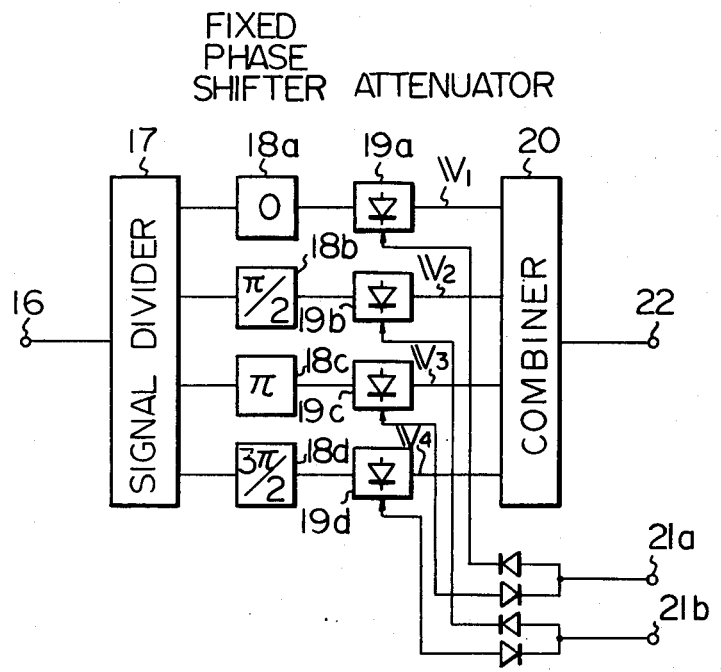

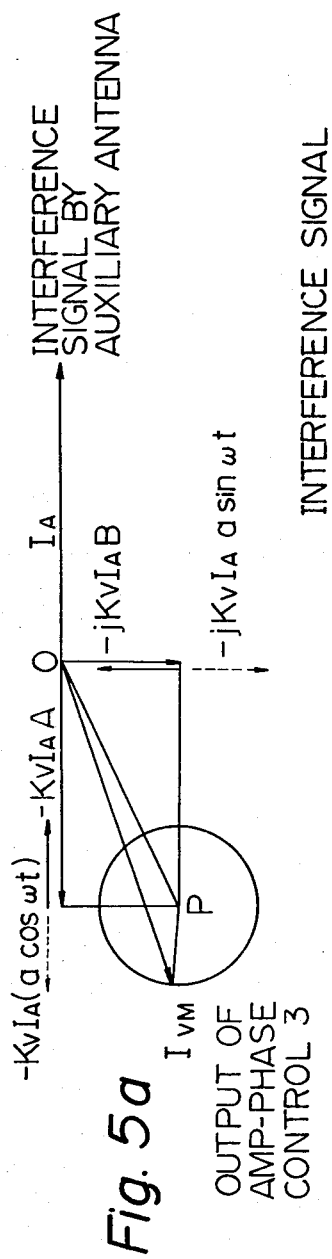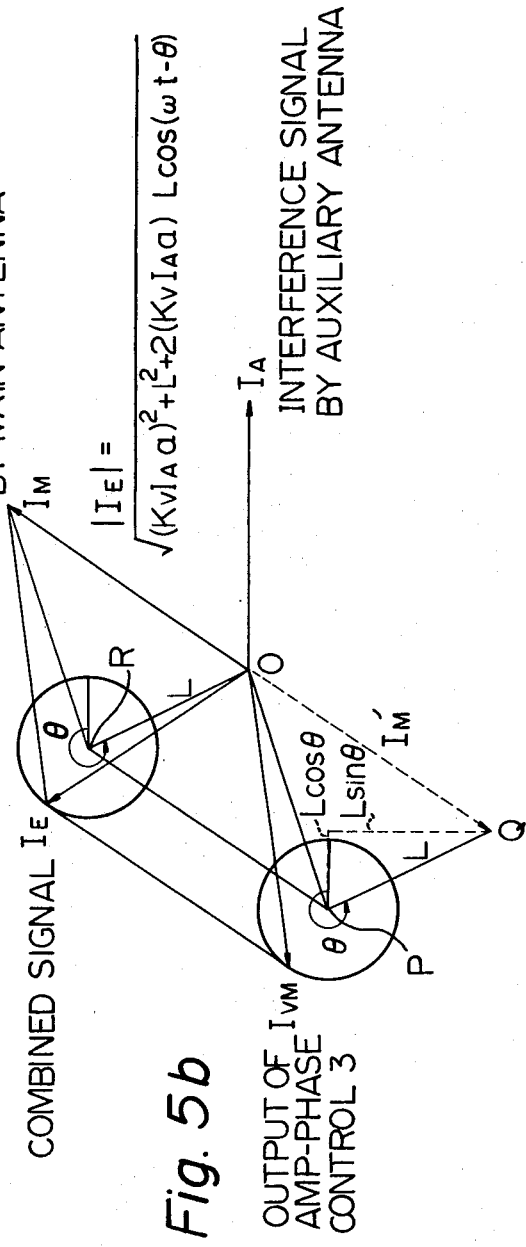

DESIRED SIGNAL

3850
MHz

INTERFERENCE SIGNAL (a)+(b)
WITHOUT COMPENSATION (a)+(b)
WITH COMPENSATION

INTERFERENCE COMPENSATION SYSTEM

BACKGROUND OF THE INVENTION

The present invention relates to an interference compensation system which cancels the undesired interference signal in a wireless communication receiver. The present invention is utilized in the earth station for a satellite communication system to which a conventional communication system gives an undesired interference signal, and of course, the present invention is utilized for a wireless communication system in general, the application of which is not restricted to a satellite communication system.

A prior system for cancelling an interference signal is shown in FIG. 1. The typical prior system is shown in British magazine "Systems Technology" No. 32, 1979 September pages 38-47, by T. A. Bristow. In FIG. 1, the reference numeral 1 is a main antenna which receives both the desired signal and the undesired interference signal, 2 is an auxiliary antenna which receives only an undesired interference signal, 3 is an amplitude-phase control circuit, 4 is a combiner, 5 is a correlation detector, 100 and 101 are frequency converters each of which includs an amplifier, 102 is a low-pass filter, and 15 is an output terminal which provides the output signal which is free from an interference signal. In FIG. 1, the main antenna 1 is directed to a desired signal, but receives both the desired signal and the undesired interference signal. The auxiliary antenna 2 is directed to the undesired interference signal, and receives only the interference signal. The interference signal received by the auxiliary antenna 2 is applied to the amplitude-phase control circuit 3 which adjusts the amplitude and the phase of the interference signal so that the output of the control circuit 3 has the equal amplitude and the anti-phase as that of the interference signal received by the main antenna 1. Thus, when the combiner 4 combines the interference signal from the main antenna with the output of the amplitude-phase control circuit 3, the interference signal is cancelled, and the desired signal is obtained at the output of the combiner. The control signal for controlling the amplitude-phase control circuit 3 is obtained by the correlation detector 5, which provides the correlation between the undesired signal received by the main antenna 1 and the undesired interference signal received by the auxiliary antenna 2. In a practical embodiment, frequency converters 100 and 101 are provided between the correlation detector 5 and each of the antennas, and a low-pass filter 102 is provided between the correlation detector 5 and the control circuit 3. Usually, the frequency converters include an amplifier. The correlation detector 5 is usually implemented by a phase detector, or a frequency mixer. It should be noted that the prior system of FIG. 1 obtains directly the correlation between the residual interference component at the output of the combiner 4 and the interference signal received by the auxiliary antenna 2 from the amplitude and the phase of the carrier signal. Accordingly, when a PSK signal (Phase Shift Keying signal) in which the phase of the signal changes rapidly according to the modulation signal is concerned, the difference between paths of the signals to the two antennas must be smaller than the predetermined value, because the output of the phase detector changes uncontinuously when the path difference is large.

However, due to the phase fluctuation of the previous stages of the correlation detectors 5 and the path fluctuation in a transmission path to each antenna when the sudden large change of the phase difference between main and auxiliary channels occurs, the interference compensation is almost impossible when a PSK signal is concerned. Further, when an FM signal is concerned, the compensation effect is not large, because no correlation between phase deviations of each signal exists when the path difference is large, and the accurate correlation is not obtained.

Further, it should be appreciated in FIG. 1 that a pair of frequency converters 100 and 101 must be provided in a prior art, and the characteristics including the amplitude characteristics and the phase characteristics of those frequency converters must be exactly the same as each other. However, the exact coincidence of two frequency converters in each ambient temperature is almost impossible.

SUMMARY OF THE INVENTION

It is an object, therefore, of the present invention to overcome the disadvantages and limitations of a prior interference compensation system by providing a new and improved interference compensation system.

It is also an object of the present invention to provide an interference compensation system which can provide the improved compensation effect It is also an object of the present invention to provide the interference compensation system which can cancel an interference signal in either PSK communication system, or an FM communication system.

It is also an object of the present invention to provide the interference compensation system which has only one frequency converter.

The above and other objects are attained by an interference compensation system comprising;

(a) a main antenna (1) for receiving both a desired signal and an interference signal $I_M$, (b) an auxiliary antenna (2) for receiving only an interference signal $I_A$, (c) an amplitude-phase control circuit (3) which receives said interference signal $I_A$ and modifies the same to provide the output signal $I_{VM}$ so that the average length and the average direction of the output vector $I_{VM}$ is defined by the values A and B, and the head of the output vector $I_{VM}$ rotates periodically according to the values (a) and ($\omega$), where A and B change according to the difference between $I_M$ and $I_A$, and (a) and ($\omega$) are given by the low frequency signals superposed on the values A and B, (d) a combiner (4) for combining the vectors $I_M$ from the main antenna, and the vector $I_{VM}$ from the amplitude-phase control circuit to provide the combined signal $I_E$ which has the information L cos ($\omega t - \theta$), where L is the length of the difference of the vectors between the vector of the present $I_{VM}$ and the desired $I_{VM}$ for cancelling $I_M$, and $\theta$ is the direction of said difference of the two vectors, (e) a low frequency oscillator (7,12) for providing the low frequency signals a·cos $\omega t$, and a·sin $\omega t$, (f) an envelope detector (10) connected to the output of said combiner (4) to provide the envelope level of the signal $I_E$ or the information L cos ($\omega t - \theta$), (g) a phase detector means (13a, 13b) receiving the output of said envelope detector (10) to provide the phase detected signals L cos $\theta$ and L sin $\theta$, (h) a voltage integrator means (6a, 6b) for integrating the outputs of said phase detector means (13a, 13b) to provide the values A and B, and (i) an adder means (8a, 8b) for providing the sums A+a·cos ωt, and B+a·sin ωt as the control signals of said amplitude-phase control circuit (3).

BRIEF DESCRIPTION OF THE DRAWINGS

The foregoing and other objects, features, and attendant advantages of the present invention will be appreciated as the same become better understood by means of the following description and accompanying drawings wherein;

FIG. 2B is a detailed block diagram of the interference compensation system according to the present invention, FIG. 3 is a block diagram of a vector modulator which is utilized as the amplitude-phase control circuit 3 in FIG. 2 or FIG. 3, FIG. 4(a) and FIG. 4(b) show the vector diagram of the output of the vector modulator of FIG. 3, FIG. 5(a) and FIG. 5(b) show the vectors of the signals in the present interference compensation system for the explanation of the operational principle of the present invention.

DESCRIPTION OF THE PREFERRED EMBODIMENTS

Figure 1:
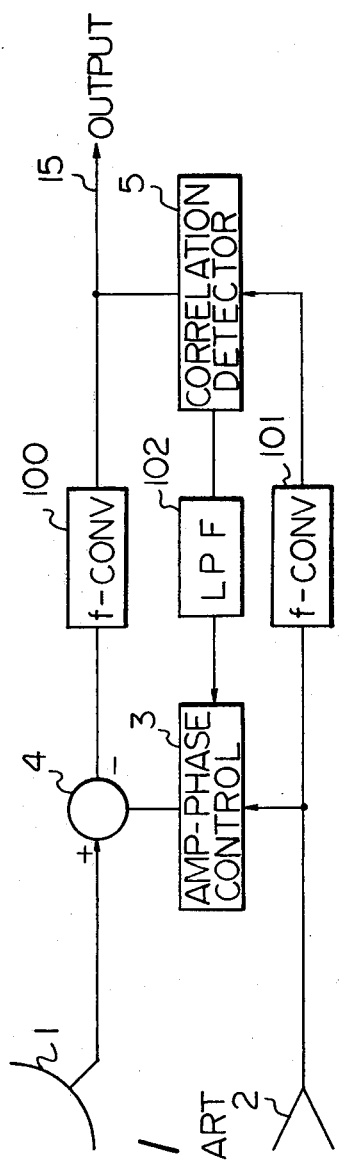
FIG. 1 is a block diagram of a prior interference compensation system.
Figure 2A:
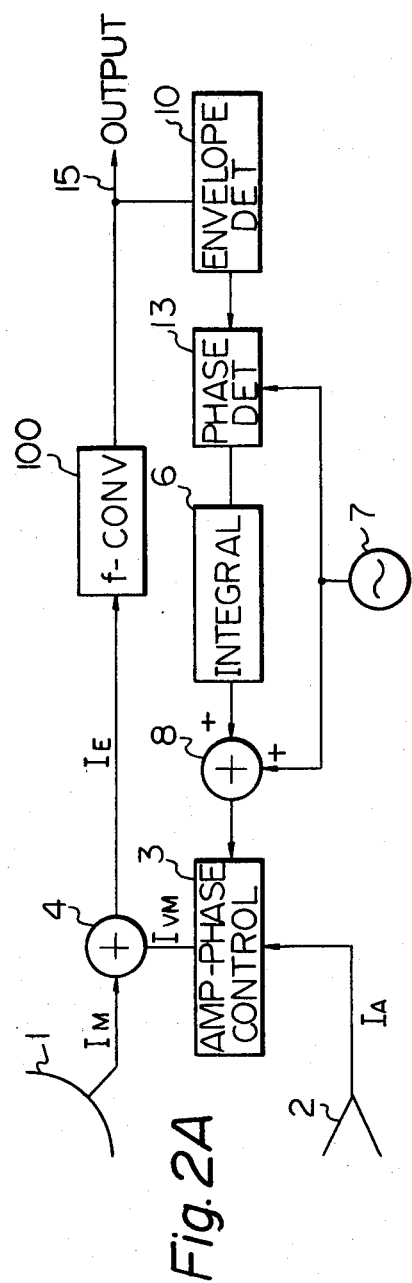
FIG. 2A is a brief block diagram of the interference compensation system according to the present invention.

FIG. 2A is a brief block diagram of the present interference compensation system, and FIG. 2B is a practical embodiment of the present interference compensation system. In those figures, the reference numeral 1 is a main antenna which receives both the desired signal and the undesired interference signal, 2 is an auxiliary antenna which is directed to the interference signal source and receives only the interference signal, 3 is an amplitude-phase control circuit which receives the interference signal from the auxiliary antenna 2 and adjusts the amplitude and the phase of that interference signal so that the amplitude of the interference signal from the auxiliary antenna is the equal to that from the main antenna 1 and the phase of the interference signal from the auxiliary antenna 2 is opposite to that of the interference signal from the main antenna 1. The reference numeral 4 is a combiner which combines the outputs of the amplitude-phase control circuit 3 and the main antenna 1, 6(6a, 6b) is a voltage accumulator or a voltage integrator, 7 is a low frequency oscillator, 8(8a, 8b) is an adder, 9 is an amplifier which includes a frequency converter, 10 is an envelope detector, 11 is an amplifier which includes a bandpass filter having the center frequency equal to the output frequency of the oscillator 7, 12 is a 90° phase shifter, 13(13a, 13b) is a phase detector, 14a and 14b are DC(direct current) amplifier having the low pass filter function, 15 is an output signal after the interference compensation, and 100 is a frequency converter.

It should be appreciated that only a single frequency converter(100 or 9) is provided, and the phase detectors(13, 13a, 13b) operate to the output signal of the envelope detector 10 which provides the signal which is not or affected by the phase change due to phase modulation or frequency modulation.

The operational principle of the present invention is as follows. The interference signal $I_A$ from the auxiliary antenna 2 is modulated slightly with the amplitude(a) and the angular frequency(ω) to provide the signal $I_{VM}$ by the amplitude-phase control circuit 3. The signal $I_{VM}$ is supposed to have the equal amplitude and the anti-phase as the interference signal $I_M$ from the main antenna 1. The signal $I_M$ from the main antenna 1 and the signal $I_{VM}$ from the amplitude phase control circuit are combined. The combined signal has of course the modulation signal component (with the amplitude (a) and the angular frequency(ω)), and that combined signal has the amplitude change relating to the phase difference(θ) between the present signal $I_{VM}$ and the desired signal $I_{VM}$ for cancelling the second signal $I_M$, and the amplitude ratio between the present signal $I_{VM}$ and the desired signal $I_{VM}$ for cancelling the second signal $I_M$. Then, the envelope of the combined signal is detected to provide the amplitude change of the combined signal. Next, the phase difference between the envelope of the combined signal and the original modulation signal (with the amplitude(a) and the angular frequency(ω)) is obtained through the phase detection operation to provide a pair of voltages $L \cos \theta$ and $L \sin \theta$, where L and θ are defined by the amplitude ratio and the phase difference between the controlled first interference signal $I_{VM}$ and the desired $I_{VM}$. Accordingly, the first interference signal $I_{VM}$ is adjusted according to said voltage informations L and θ so that the adjusted signal $I_{VM}$ has the equal amplitude and the anti-phase as that of the second interference signal.

Since the signal $I_{VM}$ is modulated by a small modulation signal with the amplitude(a) and the angular frequency(ω), the present invention is similar to a prior sensing technique in some respects. However, the present invention is different from the prior sensing technique. That is to say, the prior sensing technique changes either only an amplitude or a phase of the control signal, and the sensing signal indicates only the direction of the amplitude change or the phase change (the direction whether the amplitude is going large or small, or the direction whether the phase difference is going large or small). On the other hand, according to the present invention, both the amplitude and the phase of the control signal are changed simultaneously, and not only the direction of the change of the control signal, but also the amount of the change of the control signal are obtained simultaneously.

FIG. 3 is the embodiment of the vector modulator which operates as an amplitude-phase control circuit 3. In FIG. 3, the reference numeral 16 is an input terminal, 17 is a signal divider, 18a, 18b 18c, and 18d are fixed phase shifters, 19a, 19b, 19c and 19d are attenuators each having a PIN diode, 20 is a signal combiner, 21a and 21b are input terminals of the control signals, and 22 is an output terminal.

In FIG. 3, the input signal is divided to four paths by the signal divider 17, and each divided signal is given the phase shifts 0, $\pi/2$, $\pi$, $3\pi/2$ radian, respectively, by the fixed phase shifters 18a, 18b, 18c and 18d. Accordingly, when the input signal is expressed $I_A e^{j(\Omega t + \beta)}$ where $I_A$ is an amplitude, $\Omega$ is an angular frequency of the input signal, and $\beta$ is the initial phase, the outputs of the phase shifters 18a, 18b, 18c and 18d are shown as follows:

| | | |
|---|---|---|
| 0 phase output; | $(I_A/4) \exp j(\Omega t + \beta)$ | (1) |
| $\pi/2$ phase output; | $(I_A/4) \exp j(\Omega t + \beta + \pi/2) =$ $jI_A/4 \exp j(\Omega t + \beta)$ | (2) |
| $\pi$ phase output; | $(I_A/4) \exp j(\Omega t + \beta + \pi) =$ $-I_A/4 \exp j(\Omega t + \beta)$ | (3) |
| $3\pi/2$ phase output; | $(I_A/4) \exp j(\Omega t + \beta + 3\pi/2) =$ $-jI_A/4 \exp j(\Omega t + \beta)$ | (4) |

The outputs of the phase shifters are applied to the attenuators 19a, 19b, 19c and 19d where the amplitude of the signal are attenuated according to the current in the PIN diodes. The outputs of those attenuators are combined by the combiner 20, which provides the output signal to the output terminal 22.

Figure 4A:
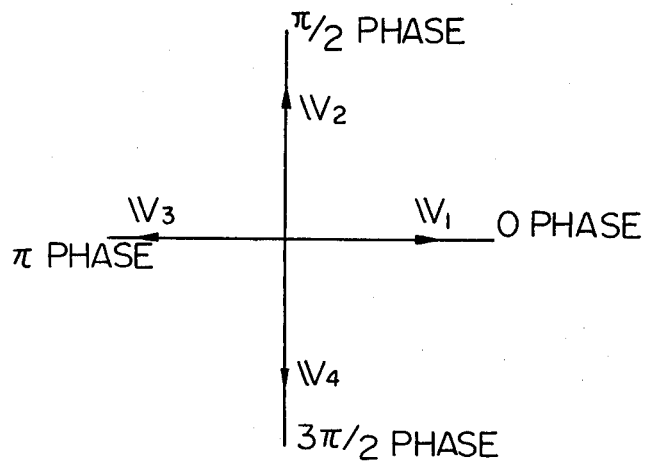
Figure 4B:
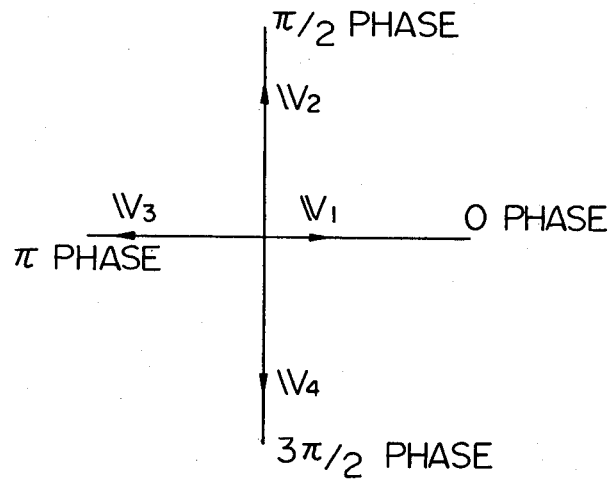

FIG. 4(a) and FIG. 4(b) show the vectors of the outputs of the PIN attenuators 19a, 19b, 19c and 19d. FIG. 4(a) shows the case where no current is provided in the PIN diodes, and so the attenuation of each attenuator is zero, and thus, the output of the vector modulator is zero as apparent from the sum of the Equations (1) through (4). On the other hand, when the control signal A is applied to the control input terminal 21a which is connected to the attenuators 19a and 19c through the diodes or rectifiers, the current proportional to the control voltage A flows in the attenuator 19a or 19c depending upon the polarity of the control voltage, which provides some attenuation. Thus, the output of the attenuator 19a is decreased relating to the control voltage A, and the O phase output vector $V_1$ is shown below.

$$V_1 = (\tfrac{1}{4}) I_A (1 - K_V A) \exp j(\Omega t + \beta) \quad (1')$$

where $K_V$ is a control gain of a vector modulator.
In this case, the combined vector has the component in $\pi$-phase as apparent from the sum of the Equations (1'), (2), (3) and (4), and that output vector is;

$$-(\tfrac{1}{4}) K_V A I_A \exp j(\Omega t + \beta)$$

Thus, the control signal in the attenuators 19a and 19c adjusts the vectors in 0- and $\pi$-phase, and the control signal at the control terminal 21b which is connected to the attenuators 19b and 19d, adjusts the vector in $\pi/2$- and $3\pi/2$-phase components. As a result, the amplitude and the phase of the signal at the output terminal 22 is arbitrarily controlled by the control input signals A and B at the terminals 21a and 21b.

Now, the operation of the present interference compensation system is explained.

It is supposed that the interference signal obtained from the auxiliary antenna 2 is shown below.

$$I_A = I_{OA} \exp (j(\Omega t + \beta)) \quad (5)$$

The interference signal $I_A$ is applied to the amplitude-phase control circuit 3. The components of that interference signal $I_A$ in the 0 phase and the $\pi$-phase are modified by the output voltage $(A + a \cdot \cos(\omega t))$ of the adder 8a, where A is the output voltage of the voltage accumulator 6a, $a \cdot \cos(\omega t)$ is the output of the low frequency oscillator 7, (a) is the amplitude of the output of the low frequency oscillator 7, and $\omega$ is the angular frequency of the low frequency oscillator 7. Similarly, the components of the interference signal $I_A$ in the $\pi/2$ phase and $3\pi/2$ phase are modified by the output voltage $(B + a \cdot \sin(\omega t))$ of the adder 8b.

Then, the output $I_{VM}$ of the amplitude-phase control circuit 3 is shown below.

$$I_{VM} = -K_V I_A ((A + a \cdot \cos \omega t) + \quad (6)$$
$$j(B + a \cdot \sin \omega t)) \exp j(\Omega t + \beta) = \Gamma_A \exp j(\Omega t + \beta + \phi)$$

where; $I_A = I_{OA}/4 \quad (7)$ $$\Gamma_A = -K_V I_A \sqrt{(A + a \cdot \cos \omega t)^2 + (B + a \cdot \sin \omega t)^2} \quad (8)$$

$$\phi = \tan^{-1}((B + a \cdot \sin \omega t)/(A + a \cdot \cos \omega t)) \quad (9)$$

Accordingly, the vector $I_{VM}$ rotates on the circle which has the radius $K_V a I_A$ and the center P $(-K_V I_A, -jK_V B I_A)$ as shown in FIG. 5(a), where the rotational speed is defined by the angular frequency ($\omega$), A is the output voltage of the voltage accumulator 6a, B is the output voltage of the voltage accumulator 6b, $a \cdot \cos \omega t$ is the output of the low frequency oscillator 7, and $a \cdot \sin \omega t$ is the output of the phase shifter 12. Also, $I_A$ is $\tfrac{1}{4}$ of the amplitude of the interference signal $I_A$, and $K_V$ is the gain of the amplitude-phase control circuit 3. It should be noted that the center P of the circle is defined by the values A and B, and the value A defines the component which is in-phase or anti-phase with the interference signal $I_A$, and B defines the component which is perpendicular to the interference signal vector $I_A$.

On the other hand, the other interference signal $I_M$ which is obtained by the main antenna 1 directed to the desired signal source is shown below.

$$I_M = I_M \exp j(\Omega t + \alpha) \quad (10)$$

The combiner 4 combines the output $I_{VM}$ of the amplitude-phase control circuit 3, and the second interference signal $I_M$, and provides the combined output $I_E$ as follows.

$$I_E = I_M + I_{VM} \quad (11)$$
$$= I_M \exp j(\Omega t + \alpha) + \Gamma_A \exp j(\Omega t + \beta + \phi)$$

-continued
$$= I_0 \exp j(\Omega t + \phi_0)$$

where;

$$I_0^2 = (\Gamma_A \cos(\beta + \phi) + I_M \cos\alpha)^2 + (\Gamma_A \sin(\beta + \phi) + I_M \sin\alpha)^2 \quad (12)$$

$$\phi_0 = \tan^{-1}((\Gamma_A \sin(\beta + \phi) + I_M \sin\alpha)/(\Gamma_A \cos(\beta + \phi) + I_M \cos\alpha)) \quad (13)$$

The combined vector $I_E$ rotates on the circle having the radius $K_V a I_A$ and the center R, where the coordinates of the center R are;

$$R(A_O I_M - K_V A I_A, j(B_O I_M - K_V B I_A)$$

where $$A_O = \cos(\alpha - \beta), \text{ and } B_O = \sin(\alpha - \beta).$$

FIG. 5(b) shows the rotation of the vector $I_E$. In FIG. 5(b), it should be appreciated that the rotating center of the vector $I_{VM}$ must be at the point Q, where the vector $OQ(=I_M')$ has the equal amplitude to that of the vector $I_M$, and the anti-phase to that of the vector $I_M$ so that the interference signal $I_M$ is cancelled by the signal $I_{VM}$. When the rotating center of the vector $I_{VM}$ is at the point Q, the combined signal $I_E$ rotates around the Origin O, and if the radius ($K_V a I_A$) of that rotation or the power defined by the radius of that circle of the rotation is sufficiently small, it is supposed that the interference signal is completely cancelled or compensated.

In order to coincide the center of the vector $I_{VM}$ with the point Q, the length L between the point Q and the point P which is the center of the vector $I_{VM}$, and the direction $\theta$ which defines the direction from the point P to the point Q must be obtained. As shown in FIG. 5(b), the angle $\theta$ is the angle between the direction parallel to the vector $I_A$ which is the interference signal from the auxiliary antenna 2 and the vector PQ. The voltage information relating to the values L and $\theta$ is accumulated or summed up to each of the previous values.

In order to obtain those values L and $\theta$, the Equation (12) is re-written as follows.

$$I_0^2 = (K_V I_A a)^2 + L^2 + 2(K_V I_A a)L \cos(\omega t - \theta) \quad (14)$$

where $$L^2 = (K_V A I_A - A_O I_M)^2 + (K_V B I_A - B_O I_M)^2$$

$$\theta = \tan^{-}((K_V B I_A - B_O I_M)/(K_V A I_A - A_O I_M))$$

Accordingly, it should be noted from the Equation (14) that the amplitude of the combined signal $I_E$ has the information relating to the values L and $\theta$. The voltage corresponding to the Equation (14) can be obtained by detecting the envelope of the combined signal $I_E$ through the envelope detector 10 after the combined signal $I_E$ is amplified to the proper level by the amplifier 9. Next, the amplifier 11 deletes the DC(direct current) components $(K_V I_A a)^2$ and $L^2$ which do not change according to the time t, and provides the voltage;

$$2K_1(K_V I_A a)L \cos(\omega t - \theta)$$

where $K_1$ is the gain of the amplifiers 9 and 11 and the envelope detector 10.

The output of the amplifier 11 is applied to the inputs of the phase detectors 13a and 13b, which receive the low frequency signals a·cos $\omega t$ and a·sin $\omega t$, respectively, as reference phases. It should be appreciated that the first phase detector provides two components L cos $(2\omega t - \theta)$ and L cos $\theta$, and the second phase detector 13b provides two components L sin $(2\omega t - \theta)$ and L sin $\theta$. The amplifiers 14a and 14b have the function of a low pass filter, and provide the outputs L cos $\theta$ and L sin $\theta$, respectively. It is supposed that the amplifiers 14a and 14b provide those outputs L cos $\theta$ and L sin $\theta$ with the proper level. The voltage accumulators 6a and 6b add those values, respectively, to the output signals A' and B', respectively, to obtain A=A'+L cos $\theta$, and B=B'+L sin $\theta$, where A' and B' are previous outputs of the accumulators 6a and 6b. The adders 8a and 8b provide the sums A+a·cos $\omega t$, and B+a·sin $\omega t$, respectively, and those outputs of the adders 8a and 8b are applied to the control inputs of the amplitude-phase control circuit 3. It should be appreciated in FIG. 5(b) that the value L cos $\theta$ is proportional to the horizontal length between the points P and Q, and the value L sin $\theta$ is proportional to the vertical length between the points P and Q. Therefore, the accumulation of those values coincides the point P with the point Q. And, due to the addition of a·cos $\omega t$ and a·sin $\omega t$ to A and B, respectively, the vector $I_{VM}$ rotates the circle having the center P and the radius $K_V I_A a$.

According to the above operation, the compensated output which is free from an interference signal is obtained at the output 15. The residual interference signal power $P_r$ in the combined signal 15 is obtained by the Equation (15), which is obtained from the Equation (14) with the condition L=$\theta$.

$$P_r = I_0^2/2 = (K_V I_A a)^2/2 \quad (15)$$

It should be appreciated in the above explanation that the phase detectors 13a and 13b operate to the output signal of the envelope detector 10, which is free from the phase change due to the phase modulation and/or the frequency modulation. Therefore, the presence of the envelope detector 10 and the phase detectors 13a and 13b are the important features of the present invention. Also, it should be noted that a single frequency converter or a single amplifier 9 is enough for the present invention, and that is also the feature of the present invention.

Figure 6:
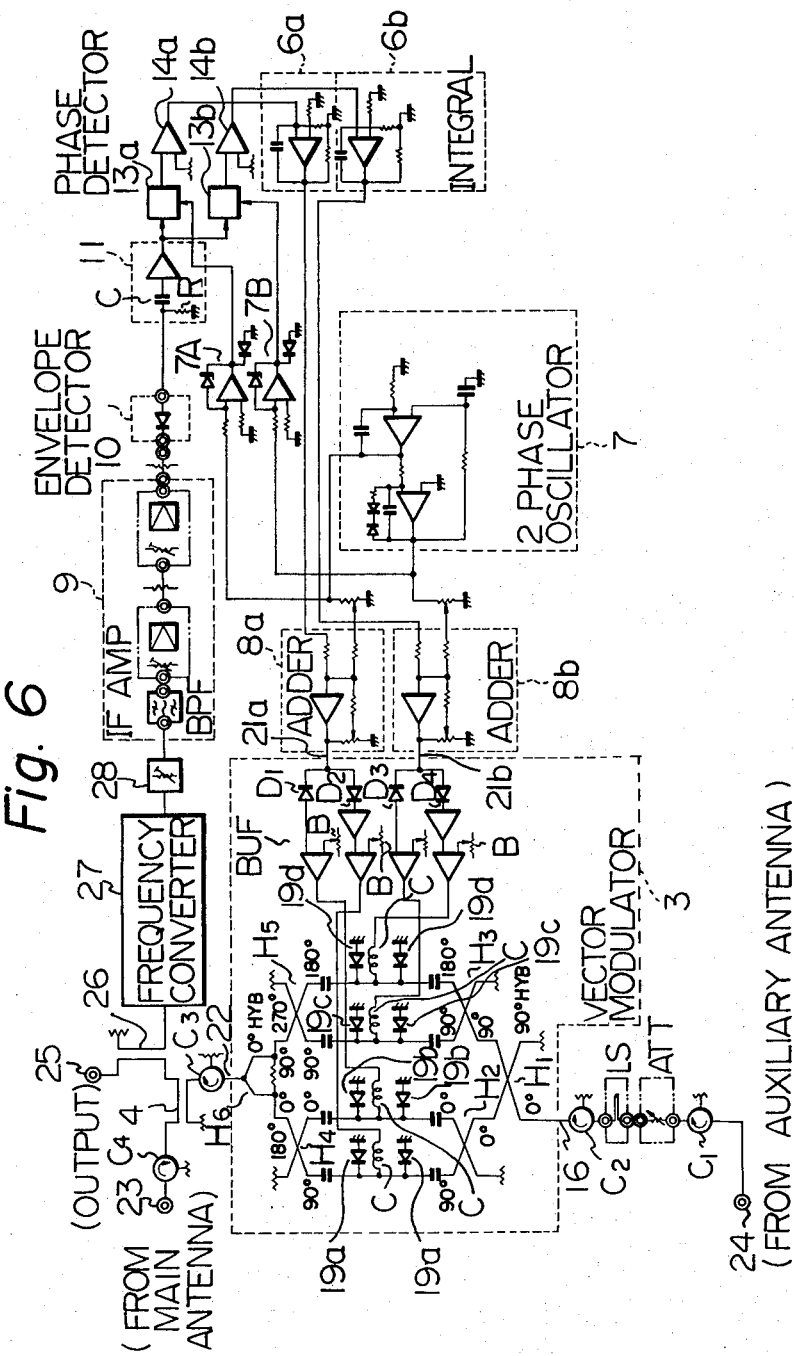
FIG. 6 is a detailed block diagram of the present interference compensation system.

FIG. 6 shows the practical embodiment of the present interference compensation system in detail. In FIG. 6, the reference numeral 23 is the first input terminal connected to the main antenna, and receives both the desired signal and the undesired interference signal, 24 is the second input terminal connected to the auxiliary antenna, and receives only the interference signal. The reference numeral 3 is an amplitude-phase control circuit which is implemented by a vector modulator, in which the signal divider 17 in FIG. 3 is implemented by hybrid circuits $H_1$, $H_2$, and $H_3$, and the combiner 20 in FIG. 3 is implemented by other hybrid circuits $H_4$, $H_5$, and $H_6$. Each hybrid circuit has a pair of input ports and a pair of output ports, and the phase of the output signals at the output ports is 0° and 90° as compared with the input phase at the input ports. Also, the combination of the 90° phase shifter and the 0° phase shifter $H_6$ which combines two signals with the inphase condition, doubles as a fixed phase shifter. The PIN diodes 19a through 19d are controlled by the control signals at the control inputs 21a and 21b through the diodes($d_1$ through d4) and the buffer amplifiers BUF, which are supposed to have a bias circuit B. The buffer amplifiers BUF and the bias circuits B operate so that when the control signal at the terminal 21a or 21b is zero, the bias current is flown in the PIN diodes 19a, 19b, 19c or 19d to provide the maximum attenuation in said PIN diodes, and when the control signal at the terminal 21a or 21b occurs, the attenuation in the PIN diodes is decreased. According to the above arrangement of the PIN diodes, the deviation or the error of both the amplitude and the phase controlled in the vector modulator is improved, and the unbalanced characteristics of each PIN diode is compensated, then, a large operational dynamic range of the vector modulator is obtained. In case of FIG. 6, the polarity of the control signals at the terminals 21a and 21b in FIG. 6, must be opposite to that of FIG. 3, so the polarity of the control signals at the terminals 21a and 21b in FIG. 6 can be arranged to conform with the vector modulator 3 in FIG. 6. It should be appreciated that the circulators $C_1$ and $C_2$, the attenuator ATT, the line stretcher LS, and the circulator $C_3$ are provided at the input and output circuits of said vector modulator 3 for the sake of stable operation of the same.

The reference numeral 4 is a combiner which combines the output of the vector modulator 3 through the circulator $C_3$ with the output of the main antenna terminal 23 through the circulator $C_4$. The reference numeral 25 is an output terminal which provides the compensated signal. That output terminal 25 is connected to the output of the combiner 4 through the hybrid circuit 26, which also connects the output of the combiner 4 to the frequency converter 27. The output terminal 25 can be provided at the output side of the frequency converter 27, instead of the input side of the frequency converter 27. The frequency converter 27 converts the input frequency to the intermediate frequency so that the envelope detector can operate. Therefore, if the input frequency at the terminal 23 is low enough to operate the envelope detector 10, that frequency converter can be omitted. In the present embodiment, the input frequency of the terminal 23 is 4 GHz band, and the intermediate frequency is 140 MHz band, and the gain of the frequency converter 27 is about 50 dB. That gain of that frequency converter 27 is adjusted by the attenuator 28 connected to the output of the frequency converter 27. The intermediate frequency amplifier 9 has a band pass filter BPF so that the desired signal-to-noise ratio is provided at the input of the envelope detector 10. The bandwidth of that bandpass filter is ±2.5 MHz. The reference numeral 11 is an amplifier which has a filter with the capacitor C and the resistor R for preventing the DC(direct current) component. No bandpass filter is used at the output of the envelope detector 9, since the frequency difference between the carrier frequency and the low control frequency is large, and the phase shift by the bandpass filter should be prevented. The reference numerals 13a and 13b are phase detectors, 14a and 14b are DC amplifiers which double as low pass filters, and 6a and 6b are integrators or voltage accumulators. The reference numeral 7 is the low frequency oscillator which is a two-phase generator providing two outputs with the phase difference 90°. Therefore, no phase shifter is utilized in FIG. 6. The output frequency of the low frequency oscillator 7 is in the present embodiment in the range from 170–180 Hz. The higher that frequency is, the quicker the response of the compensation system is. However, if that frequency is close to 300 Hz, the noise would be leaked into the control signal from a voice channel or a telephone channel. The symbols 7A and 7B are square wave converters which converts the sine-wave signals to square wave signals. Those converters 7A and 7B might be omitted if the phase detectors 13a and 13b are properly designed. The reference numerals 8a and 8b are adders which double as amplifiers.

Figure 7:
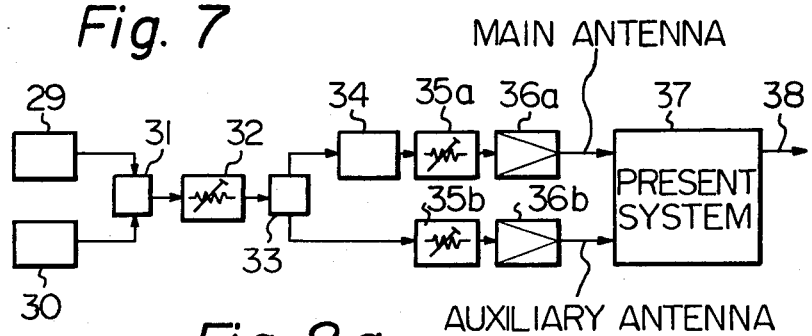
FIG. 7 is a block diagram of the measurement system for measuring the characteristics of the present interference compensation system.

FIG. 7 shows a block diagram of the measurement system for measuring the characteristics of the present interference compensation system. In the figure, the reference numeral 29 is a signal source of an interference signal, and generates CW (continuous wave) signal, FM signal (frequency modulated signal), or PSK signal (phase shift keying signal) as an interference signal. The 30 is a sweep oscillator for measuring the characteristics of the interference signal cancellation effect versus frequency. The reference numeral 31 is a combiner, 32 is an attenuator for providing the desired level of the signal, 33 is a signal divider, 34 is an amplitude modulator or a phase modulator, which simulates the fluctuation of the amplitude ratio or the phase difference between the main channel interference signal and the auxiliary channel interference signal. The 35a and 35b are attenuators, 36a and 36b are amplifiers. The output of the amplifier 36a corresponds to the output of the main antenna 1 of FIG. 2B, and the output of the amplifier 36b corresponds to the output of the auxiliary antenna 2 of FIG. 2B. The attenuators 35a and 35b, and the amplifiers 36a and 36b provide the desired levels of the interference signals to the present interference compensation system. The reference numeral 37 is the present interference compensation system to be tested, and the block diagram of 37 is shown in FIG. 2A, FIG. 2B, or FIG. 6. The reference numeral 38 is the output of the system 37, and that numeral 38 is the same as 15 in FIG. 2A, FIG. 2B or 25 in FIG. 6. The modulator 34 provides the relative amplitude or the relative phase between the main antenna signal and the auxiliary antenna signal to measure the response of the present control loop.

Figure 11:
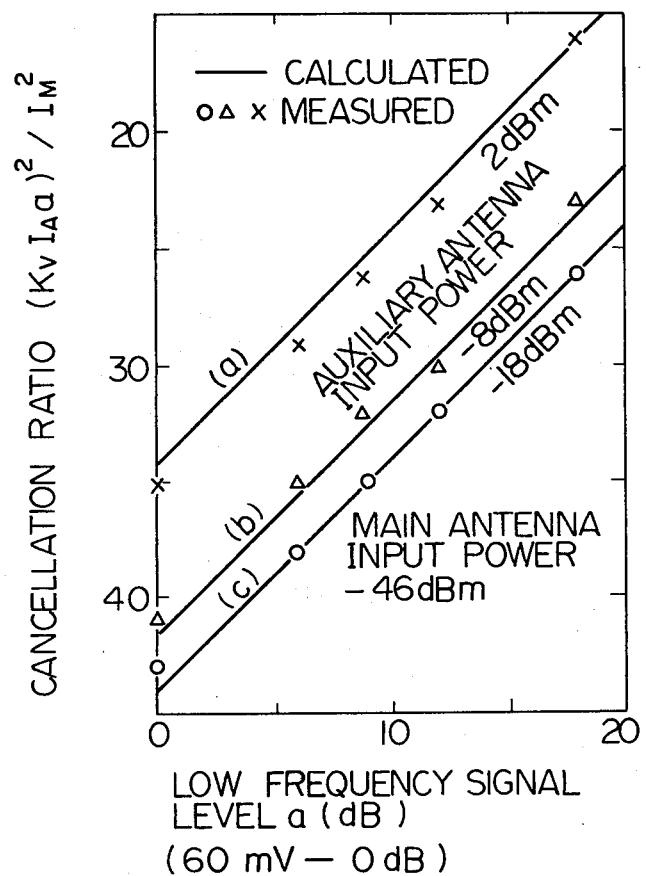
FIG. 11 shows the curves showing the relation between the amplitude of the low frequency signal superposed on the control signals and the compensation effect.

Now, the experimental results using the equipment of FIG. 7 are described in accordance with FIGS. 8 and 11.

Figure 8A:
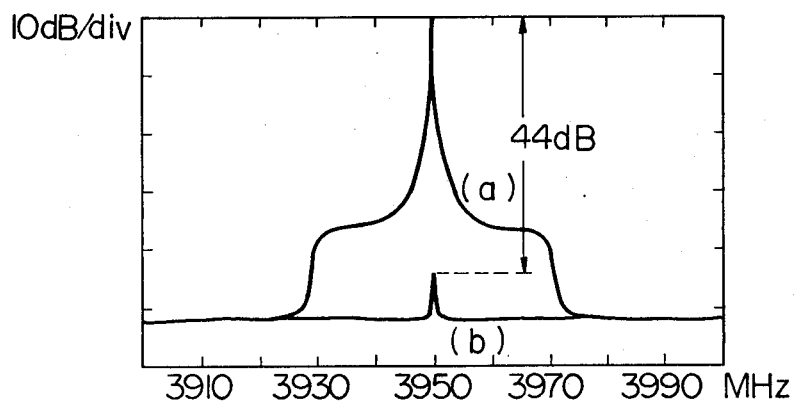
FIG. 8(a) and FIG. 8(b) are curves showing the compensation effect for an interference signal.
Figure 8B:
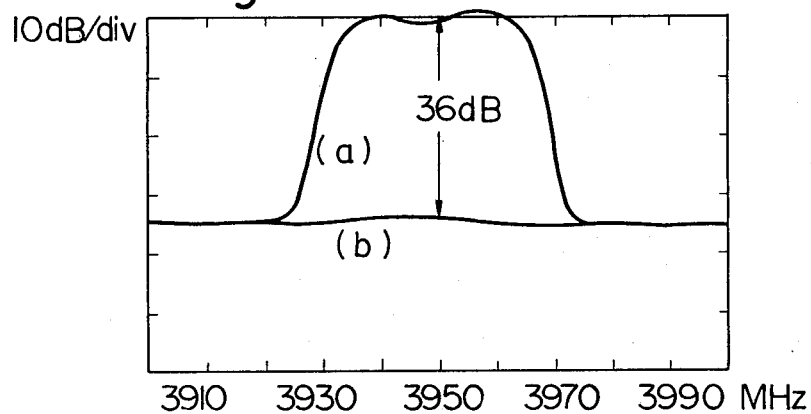

FIGS. 8(a) and 8(b) show the interference signal cancellation when only the interference signal is applied to the present system, and no desired signal is applied to the present system. In those figures, the horizontal axis shows the frequency, and the vertical axis shows the level at the output terminal 25 in FIG. 6, and each division in the vertical axis shows 10 dB. In FIG. 8(a), the FM wave which is equivalent to the 3600 telephone channels (the carrier center frequency is 3950 MHz) is applied to the present system as an interference signal. The curve (a) shows the spectrum of the output signal at the terminal 25 of FIG. 6 when no compensation is effected (compensation effect can be removed by, for instance, cutting the output of the vector modulator. The curve (b) shows the output spectrum of the output signal at the terminal 25 when the compensation system operates. By comparing the curves (a) with (b), it should be noted that the level ratio of the interference signals or the cancellation ratio is about 44 dB.

FIG. 8(b) shows the case that the interference signal is 8-phase PSK signal (carrier center frequency is 3950 MHz, and the clock rate is 30.302 Mb/s (megabits per second)). The curve (a) is the characteristics spectrum when no compensation system is utilized, and the curve (b) is the spectrum with the compensation system. In the case of FIG. 8(b), the cancellation ratio is about 36 dB, as the upper level of the input signal is restricted by the saturation level of the amplifiers 36a and 36b, and it should be noted that the interference signal is compressed to the thermal noise level.

From the above results, it should be appreciated that the present interference compression system is effective concerning the interference signal of FM signal and PSK signal, and the compression ratio is about 40 dB with the bandwidth wider than 50 MHz. Of course, the present compression system is effective to CW signal. Further, it has been experimented that the effective response is possible to the amplitude change of the interference signal between the two inputs until said amplitude change is 90 dB/second (which corresponds to the change of 10 dB in 3 Hz), and also, the effective response is possible to the phase change of 370°/second (which corresponds to the change of 10° in 12 Hz) of the interference signals between the two inputs.

Figure 9:
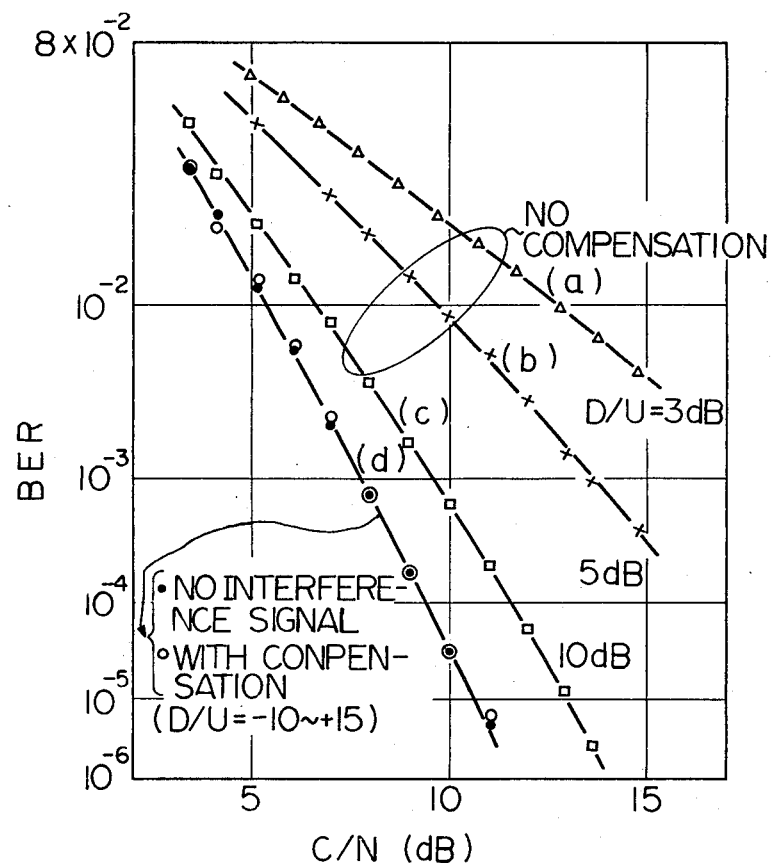
FIG. 9 shows curves showing the experimental improvement of the error rates of the PSK signal in the present invention.

FIG. 9 shows the experimental result when both the desired signal and the interference signal exist. In the experiments of FIGS. 9 and 10, the desired signal is further applied to the main antenna terminal in FIG. 7. In FIG. 9, the desired signal is the 2-phase PSK signal with the carrier center frequency 3850 MHz and the clock rate 1.568 Mb/second, and the interference signal is the FM signal with the carrier center frequency 3850 MHz and equivalent to 1800 telephone channels. The horizontal axis of FIG. 9 shows the power(C) of the desired signal and the thermal noise power(N), (ratio C/N), and the vertical axis shows the bit error rate(BER) of the desired signal(PSK). The curves a, b, and c show the characteristics when no compensation is performed, where the curve (a) shows the case that the desired signal power(D) to the interference signal power(U) ratio D/U, is 3 dB, the curve (b) shows the case that said ratio D/U is 5 dB, and the curve (c) shows the case that said ratio D/U is 10 dB. The black dots on the curve (d) shows the experimental result when no interference signal is applied to the present system, and the white dots on the curve (d) show the experimental result when the present compensation operation is performed and the D/U ratio is in the range from $-10$ dB to $+15$ dB.

It should be understood from FIG. 9 that the bit error rate(BER) of a PSK signal is improved even when the desired signal and the undesired interference signal co-exist in the same channel with the D/U ratio $-10$ dB through $+15$ dB, and the bit error rate(BER) with the compensation is almost the same as that when no interference signal exists.

Figure 10A:
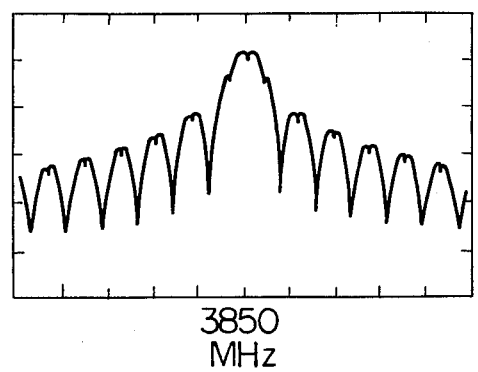
FIGS. 10(a) through (d) shows the experimental spectra showing the compensation effect according to the present invention on the condition that the desired signal and the interference signal exist in the same channel.
Figure 10B:
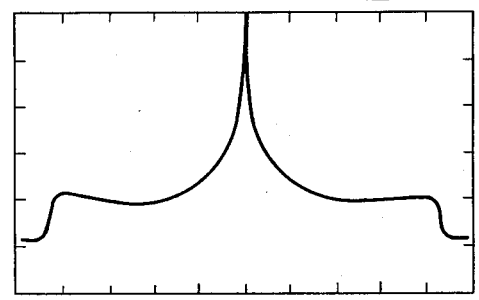
Figure 10C:
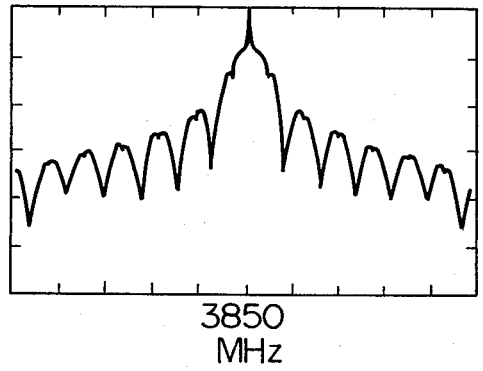
Figure 10D:
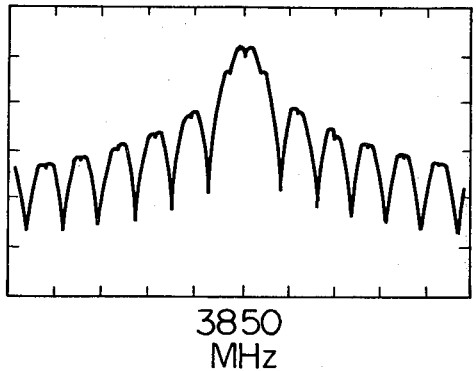

FIGS. 10(a) through 10(d) show the spectra of each signal when the experiment of FIG. 9 is carried out. FIG. 10(a) shows the desired signal which is the 2-phase PSK signal with the clock rate 1.568 Mb/second, FIG. 10(b) shows the spectrum of the undesired interference signal which is the FM signal equivalent to 1800 telephone channels, FIG. 10(c) is the spectrum of the sum of the spectrum of FIG. 10(a) and the spectrum of FIG. 10(b) with the D/U 0 dB and no compensation, and FIG. 10(d) is the spectrum when the compensation is performed for the spectrum of FIG. 10(c). The spectra of FIG. 10(a) through FIG. 10(d) are measured at the output terminal 25 of FIG. 6.

FIG. 11 shows the calculated curve and the experimental result of the relations between the amplitude of the low frequency signal at the inputs of the vector modulator, and the cancellation ratio of the interference signal, where the horizontal axis shows the amplitude(a) of the low frequency signal at the inputs of the vector modulator, and the vertical axis shows the cancellation ratio. The reference level 0 dB of the low frequency signal is equal to 60 mili-volt. The calculated cancellation ratio is obtained by the formula;

$$(K_V I_A a)^2 / I_M^2$$

where $(K_V I_A a)$ is obtained by the formula (15) after the measurement of the control gain $(K_V)$ of the vector modulator 3, the power($I_A^2$) of the interference signal, the amplitude(a) of the low frequency signal, and the signal loss in the vector modulator, and $I_M^2$ is obtained by measuring the interference signal power in the main antenna.

In FIG. 11, the curve a shows the case that the interference signal power in the auxiliary antenna is 2 dBm, the curve (b) shows the case that the interference signal power in the auxiliary antenna is $-8$ dBm, the curve (c) shows the case that the interference signal power in the auxiliary antenna is $-18$ dBm, and the interference signal power in the main antenna is $-46$ dBm for all the cases(a,b,c). The solid lines(a,b,c) show the calculated results, and the dots (o,Δ,x) show the experimental results.

It should be clear from FIG. 11 that the cancellation ratio of the interference signals is inverse-proportional to the amplitude (a) of the low frequency signal, and that the Equation (15) gives the residual interference power accurately. It should be appreciated in the Equation (15) that the $P_r$ is also proportional to the amplitude($I_A$) of the interference signal in the auxiliary antenna, but those three values are not exactly proportional to each other in FIG. 11. That comes from the reason that the control gain $K_V$ of the vector modulator is also changed by the change of the $I_A$.

FIGS. 12(a) through 12(d) show the experimental spectra at the output terminal 25 in the actual transmission test (so the apparatus of FIG. 7 is not used). The experimental system has the main antenna of the cassegrain antenna with the diameter 1.5 meters, the auxiliary antenna of the electromagnetic horn with the diameter 0.15 meters. The desired signal is the CS beacon signal which is given by the geostationary satellite SAKURA on the 135° of east longitude, and the interference signal is the CW wave (continuous wave) positioned at 1.6 km from the antennas. The center frequency of both the desired signal and the interference signal is 3950 MHz. The horizontal axis shows the frequency with 0.5 MHz/division, and the vertical axis shows the level with 10 dB/division.

Figure 12A:
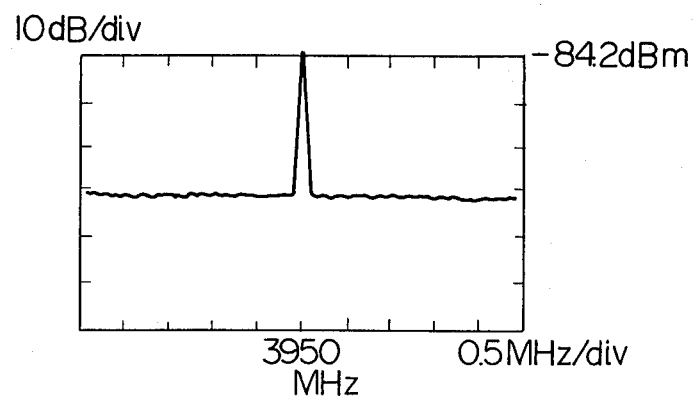
FIGS. 12(a) through (d) show the experimental results of the compensation effect in the actual transmission test.
Figure 12B:
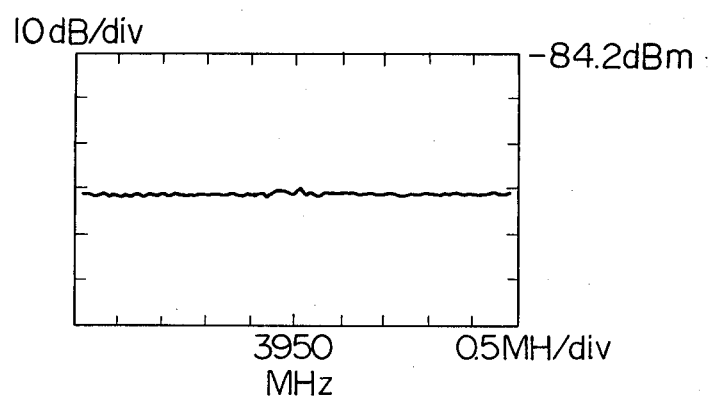
Figure 12C:
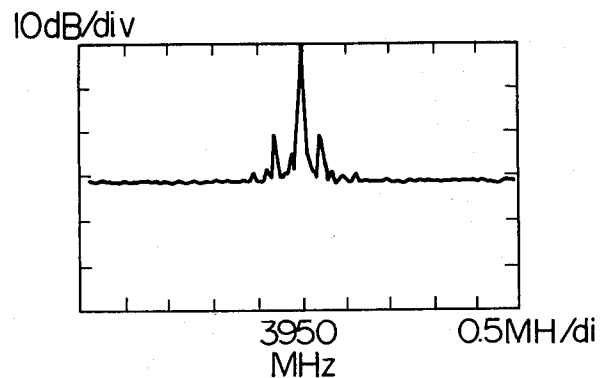
Figure 12D:
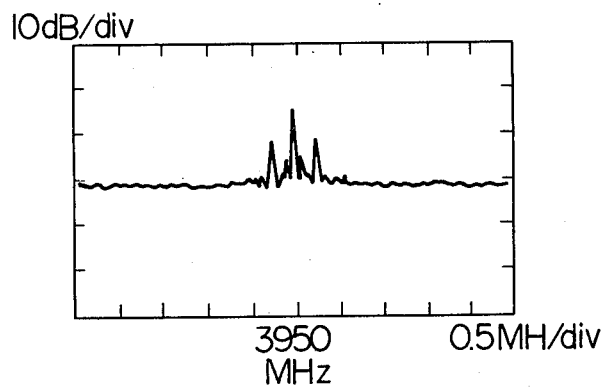

FIG. 12(a) shows the spectrum when only the interference signal is received and no compensation is performed, and FIG. 12(b) shows the spectrum when only the interference signal is received and is compensated. It should be noted from FIG. 12(b) that the interference signal is compressed to about $-114$ dBm, which is almost the thermal noise level. FIG. 12(c) shows the spectrum when both the desired signal(CS beacon wave) and the interference signal are received, and no compensation is performed. And FIG. 12(d) shows the spectrum when the compensation is performed for the spectrum of FIG. 12(c). It should be appreciated from FIG. 12(d) that the interference signal is completely compressed and only the desired signal(CS beacon signal) is observed. From FIGS. 12(a) through 12(d), it should be clear that the present system can completely compensate the interference signal and responds satisfactorily to the amplitude fluctuation and the phase fluctuation of the signals. The present system is effective when the transmission path length of the interference signal is about 1.6 km. Of course it should be appreciated that the present system is applicable to the case that the path length is longer than 1.6 km, although the experiment was performed with the path length 1.6 km.

Figure 13:
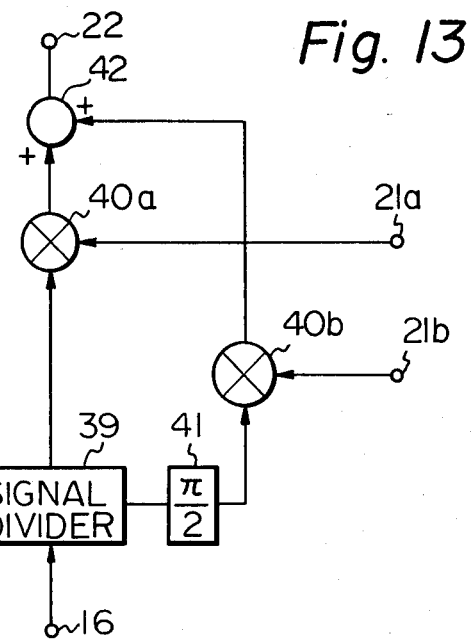
FIG. 13 shows a block diagram of another amplitude-phase control circuit.

FIG. 13 is the block diagram of another embodiment of the amplitude-phase control circuit 3. In the figure, the reference numeral 16 is the input terminal of an interference signal, 21a and 21b are input terminals of the control signals, 39 is a signal divider, 40a and 40b are the balanced modulators or mixers, 41 is a 90° phase shifter, 42 is a signal combiner, and 22 is an output terminal. The interference signal $I_A$ received by the auxiliary antenna is applied to the input terminal 16 and is divided to the two paths by the signal divider 39. The first output of the signal divider 39 is applied to the balanced modulator or mixer 40a, and the second output of the signal divider 39 is applied to the other balanced modulator or mixer 40b through the 90° phase shifter 41 which shifts the phase of the input signal by 90°. The inputs signals to the balanced modulators 40a and 40b are;

$(I_{OA}/2) \exp j(\Omega t + \beta)$, and $j(I_{OA}/2) \exp j(\Omega t + \beta)$, respectively. The balanced modulators 40a and 40b receive also the control signals;

$(A + a \cdot \cos \omega t)$, and $(B + a \cdot \sin \omega t)$, respectively from the control input terminals 21a and 21b, respectively.

Accordingly, the output of the balanced modulator 40a is;

$$(K_M I_{OA}/2)(A + a \cdot \cos \omega t) \exp j(\Omega t + \beta) \quad (16)$$

where $K_M$ is the sensitivity of the balanced modulator 40a, and the output of the balanced modulator 40b is;

$$j(K_M I_{OA}/2)(B + a \cdot \sin \omega t) \exp j(\Omega t + \beta) \quad (17)$$

Those outputs of the balanced modulators are combined by the combiner 42 which provides the combined output to the output terminal 22. The combined output at the terminal 22 is;

$$I_{VM} = (K_M I_{OA}/2)((A + a \cdot \cos \omega t) + j(B + a \cdot \sin \omega t)) \exp j(\Omega t + \beta) \quad (18)$$

It should be noted in the formula (18) that $K_M$ and $I_{OA}$ are constants, and so the formula (18) is the same as the formula (6), thus, the apparatus of FIG. 13 operates in the same manner as the vector modulator of FIG. 3. The signal divider 39 and the 90° phase shifter 41 in FIG. 13 can be implemented by the combination of 90° hybrid circuits as shown in FIG. 6, and the signal combiner 42 can also be implemented by hybrid circuits, on the condition that the polarity of the control signals at the terminals 21a and 21b is properly designed.

Figure 14:
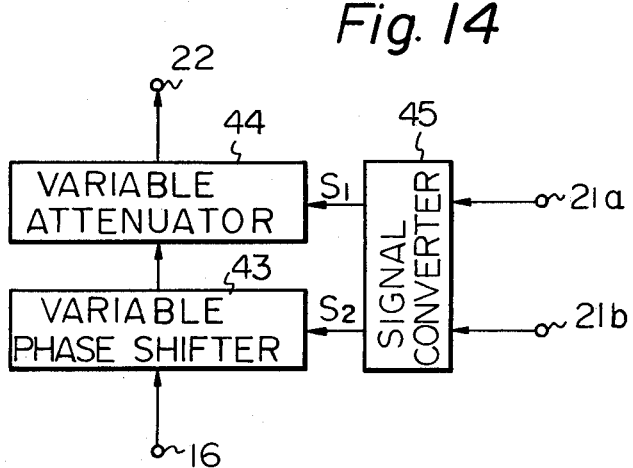
FIG. 14 is a block diagram of the still another amplitude-phase control circuit.

FIG. 14 shows the block diagram of still another embodiment of an amplitude-phase control circuit. The embodiment of FIG. 14 utilizes a variable attenuator (or amplifier). In the figure, the reference numeral 16 is the input terminal of the interference signal, 21a and 21b are input terminals of the control signals, 43 is a variable phase shifter, 44 is a variable attenuator or a variable amplifier, 45 is a signal converter, and 22 is an output signal. The interference signal received by the auxiliary antenna is applied to the input terminal 16, and is applied to the variable phase shifter 43, which steers the phase of the input signal. The output of the phase shifter 43 is applied to the variable attenuator (or amplifier) 44 to steer the amplitude of the signal. The steering signals $S_1$ and $S_2$ for steering the circuits 44 and 43 are provided by the signal converter 45, which receives the control signals $(A + a \cdot \cos \omega t)$ from the control input terminal 21a, and $(B + a \cdot \sin \omega t)$ from the control input terminal 21b, and provides the steering signals $S_1$ and $S_2$ as shown below.

$$S_1 = \sqrt{(A + a \cdot \cos \omega t)^2 + (B + a \cdot \sin \omega t)^2} \quad (19)$$

$$S_2 = \tan^{-1}((B + a \cdot \sin \omega t)/(A + a \cdot \cos \omega t)) = \phi \quad (20)$$

The variable attenuator (or amplifier) 44 provides the output, the amplitude of which is proportional to the steering signal $S_1$, and the variable phase shifter 43 provides the output signal, the phase shift which is proportional to the steering signal $S_2$. As a result, the output signal $I_2$ at the output terminal 22 is;

$$I_2 = \quad (21)$$

$$I_{OA} \sqrt{(A + a \cdot \cos \omega t)^2 + (B + a \cdot \sin \omega t)^2} \exp j(\Omega t + \beta + \phi)$$

The output signal $I_2$ is also proportional to $I_{VM}$ of the formula (6), and so, the circuit of FIG. 14 functions similar to the vector modulator 3 in FIG. 3, on the condition that the polarity of the control input signals is properly designed, or the combiner 4 is designed as an adder or a subtractor according to that polarity.

Figure 15:
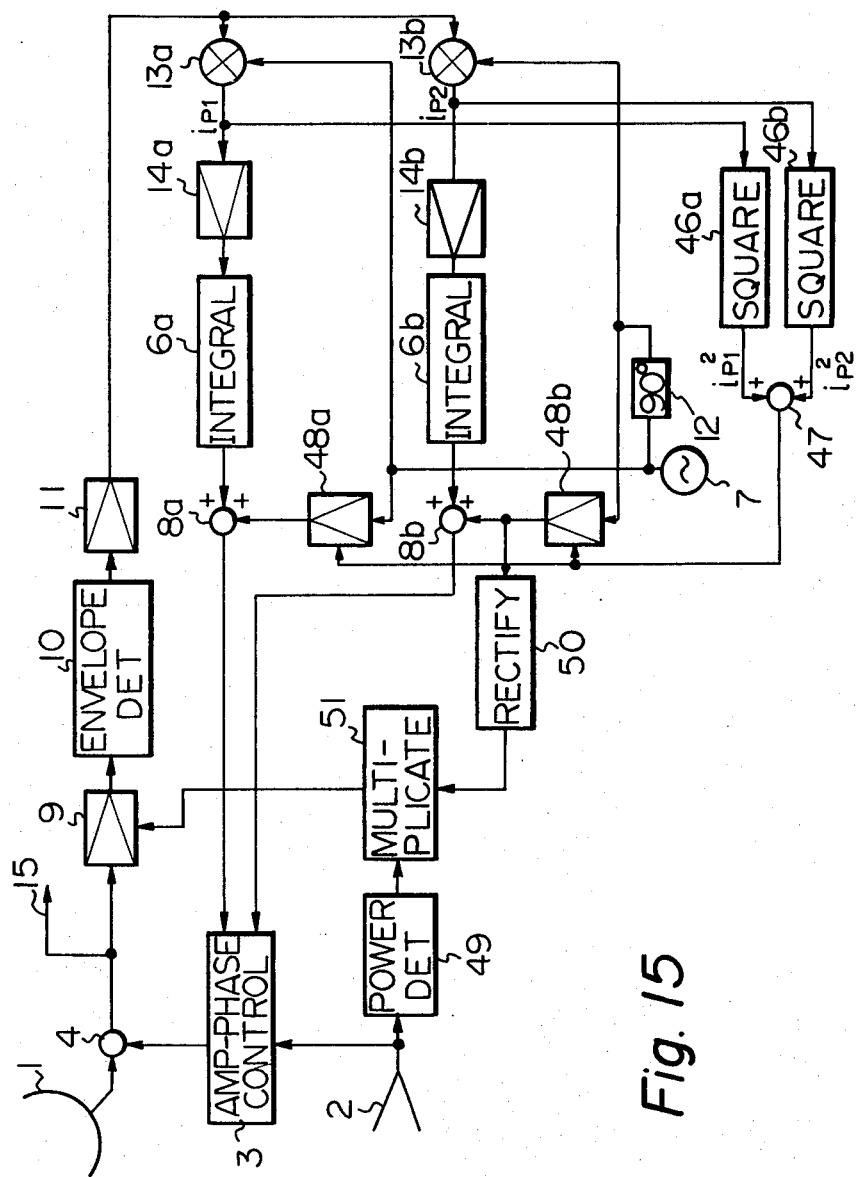
FIG. 15 is a block diagram of the another interference compensation system according to the present invention.

FIG. 15 is the block diagram of the other embodiment of the interference compensation system according to the present invention. In the figure, the reference numeral 1 is a main antenna directed to the desired signal, 2 is an auxiliary antenna directed to the interference signal, 3 is an amplitude-phase control circuit, 4 is a combiner, 6a and 6b are voltage integrators, 7 is a low frequency oscillator, 8a and 8b are adders, 9 is a variable gain amplifier, 10 is an envelope detector, 11 is an amplifier, 12 is a 90° phase shifter, 13a and 13b are phase detectors, 14a and 14b are DC (direct current) amplifiers, 15 is the output terminal providing the compensated desired signal, 46a and 46b are square circuits, 47 is an adder, 48a and 48b are amplifiers, 49 is a power detector, 50 is a rectifier, and 51 is a multiplicator. The variable gain amplifier 9 is inserted in a high frequency stage in the embodiment of FIG. 15, but that amplifier 9 can be positioned not only at a high frequency stage, but also at DC stage, which is on the path from the output of the envelope detector 10 to the outputs of the adders 8a and 8b through the voltage integrators 6a and 6b, the amplifiers 14a and 14b, and the phase detectors 13a and 13b. Also, that variable gain amplifier 9 may be replaced by a variable loss attenuator, when a signal level is too high, that is to say, that a variable gain amplifier can be a variable gain control means.

The features of FIG. 15 as compared with the embodiment of FIG. 2B are (1) the amplitude(a) of a low frequency signal applied to the adders 8a and 8b is controlled according to the power at the output of the envelope detector 10 or the outputs of the phase detectors 13a and 13b, and (2) the loop gain of the regulation loop comprising the combiner 4, the envelope detector 10, the phase detectors 13a and 13b, the voltage integrators 6a and 6b, the adders 8a and 8b, and the amplitude-phase control circuit 3, is adjusted by the variable gain amplifier (or attenuator) 9 according to either the interference signal power from the auxiliary antenna 2 or the power of the low frequency signal from the oscillator 7.

It should be noted in the formula (15) that the residual interference signal power $P_r$ which is not compensated by the present system, is proportional to the amplitude(a) of the low frequency signals which are added to the outputs(A,B) of the voltage integrators 6a and 6b, on the condition that the control gain $K_V$ of the amplitude-phase control circuit 3, and the interference signal level $I_A$ from the auxiliary antenna are constant. Accordingly, when that amplitude(a) of the low frequency oscillator is decreased after the compensation control loop is converged and the value L becomes zero, the residual interference power $P_r$ can be decreased. Accordingly, in the embodiment of FIG. 15, the amplitude (a) of the low frequency signal is adjusted according to the value L (see FIG. 5B).

Now, the output voltage $i_{P1}$ of the output of the phase detector 13a, and the output voltage $i_{P2}$ of the output of the phase detector 13a are shown below.

$$i_{P1} = K_1 K_V I_A(a)(b) L \cos \theta \tag{22}$$

$$i_{P2} = K_1 K_V I_A(a)(b) L \sin \theta \tag{23}$$

where $K_1$ is the gain from the output of the combiner 4 to the phase detector 13a or 13b, (b) is the amplitude of the low frequency signal at the inputs of the phase detectors 13a and 13b.

Accordingly, the voltage corresponding to $(K_1 K_V I_A ab)^2 L^2$ is obtained at the output of the adder 47 which provides the sum of the outputs ($i_{P1}^2$, $i_{P2}^2$) of the square circuits 46a and 46b. Then, the gain of the amplifiers 48a and 48b is controlled according to said output voltage of the adder 47, then, the amplitude of the low frequency signal applied to the adders 8a and 8b is controlled according to the value $L^2$ so that when $L^2$ is large the amplitude of the low frequency signal is large, and vice versa. Then, the residual interference signal is reduced, and the compensation performance is improved. The square circuits 46a and 46b are implemented by a full wave rectification circuit using a diode with square characteristics or a square detector, and the adder 47 is implemented by using a DC amplifier. The amplifiers 48a and 48b are controlled by the output of the adder 47, and it should be appreciated that said amplifiers 48a and 48b can be replaced by attenuators if the output level of the low frequency oscillator 7 is too high.

Figure 16:
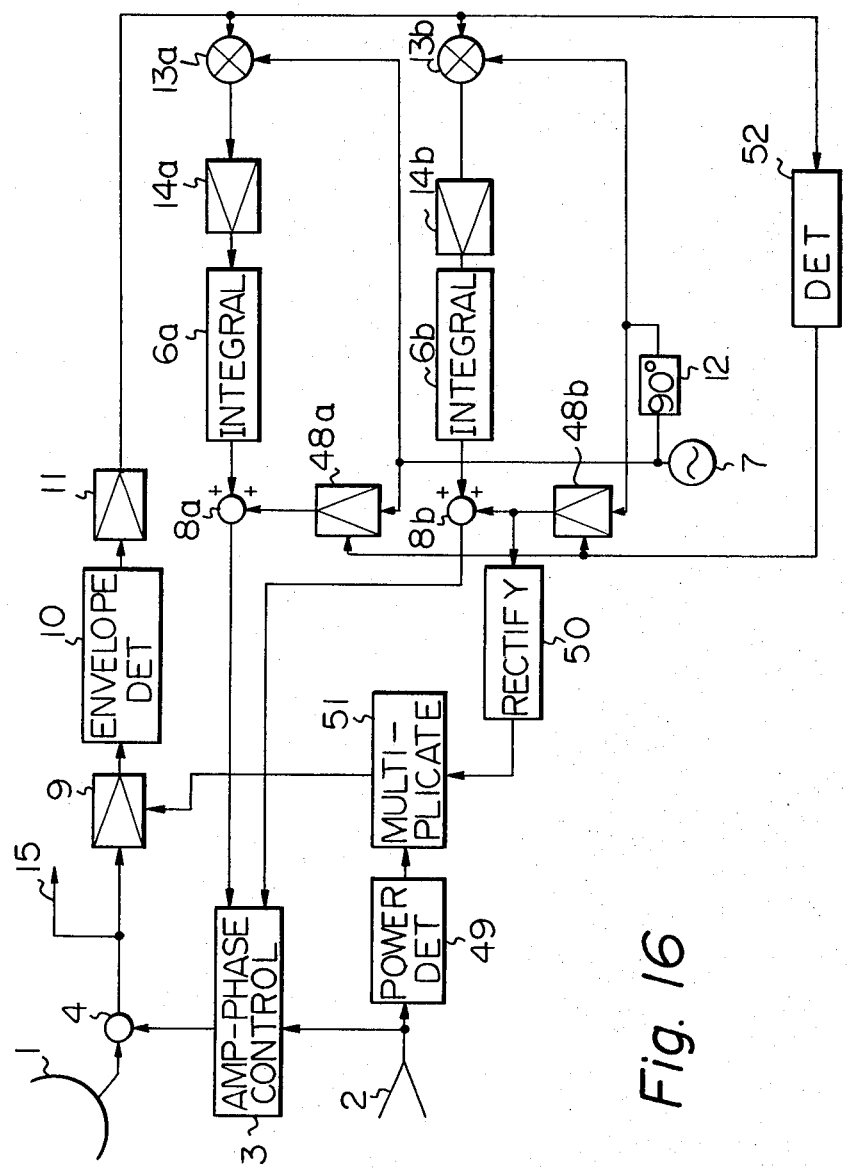
FIG. 16 is a block diagram of the modification of the interference compensation system of FIG. 15.

FIG. 16 is the modification of the equipment of FIG. 15. In FIG. 16, the control of the amplitude of the low frequency signal applied to the adders 8a and 8b has the feature. In FIG. 16, the output signal of the envelope detector 10 is applied to the amplifier 11, which amplifies the signal and deletes the DC (direct current) component. The output of the amplifier 11 is expressed as follows as apparent from the Equation (14).

$$2K_1(K_V I_A a) L \cos(\omega t - \theta)$$

Accordingly, by rectifying said output signal of the amplifier 11 or the input signal of the phase detectors 13a and 13b through the rectifier or the diode 52, the signal proportional to $4K_1^2(K_V I_A a)^2 L^2$ or $2K_1(K_V I_A a)L$ is obtained. Accordingly, the output of the rectifier or the diode 52 can control the gain of the amplifiers 8a and 8b according to said principle to adjust the amplitude of the low frequency signal and reduce the residual interference signal.

By the way, the amplitude $I_0$ of the residual interference signal after compensation is given by the Equation (15). In that case, the voltages added to the preceding voltages at the outputs of the voltage integrators 6a and 6b are expressed, respectively, as follows.

$$K_O K_V I_A(a)(b) L \cos \theta = G_L L \cos \theta \tag{24}$$

$$K_O K_V I_A(a)(b) L \sin \theta = G_L L \sin \theta \tag{25}$$

where $K_O$ is the gain from the output of the combiner 4 to the output of the voltage integrator (6a, 6b), and $G_L$ is the loop gain of the control loop comprising the combiner 4, the envelope detector 10, the phase detector 13a or 13b, the voltage integrator 14a or 14b, the adder 8a or 8b, and the amplitude-phase control circuit 3.

Accordingly, when the level $I_A$ of the interference signal from the auxiliary antenna, and/or the amplitude(a) of the low frequency signal applied to the voltage integrators change, the loop gain $G_L$ changes, and the change of said loop gain causes the change of the response characteristics of the interference compensation loop.

In order to solve the change of the response characteristics due to the change of $I_A$, the power detector 49 and the variable gain amplifier 9 are provided. The power detector detects the power of $I_A$ or the absolute voltage of $I_A$ at the input of the amplitude-phase control circuit 3, and controls the loop gain by changing the gain of the amplifier 9 so that when the detected power is large the loop gain is small, and when the detected power is small the loop gain is large. The power detector 49 is implemented by an envelope detector or a crystal rectifier, and a bandpass filter, an amplifier, and/or a frequency converter are attached to the power detector 49 according to the situation of the frequency, the power, and/or the noise. The control of the loop gain is accomplished not only by changing the gain of the amplifier 9, but also by changing the gain of the amplifier 11 or the amplifiers 14a and 14b. Alternatively, the gain of more than two amplifiers can be controlled.

Next, in order to solve the change of the response characteristics due to the change of the amplitude(a) of the low frequency signal, the rectifier 50 is provided. In this case, the input voltage of the adder 8a or 8b is applied to the rectifier 50, which provides the DC voltage proportional to the amplitude (a) of the low frequency signal, and the output voltage of the rectifier 50 controls the loop gain by controling the gain of the amplifier 9, and/or 11 and/or 14a and 14b, so that when the output voltage of the rectifier 50 is large, the loop gain is small, and when the output voltage of the rectifier 50 is small the loop gain is large.

Further, the change of the response characteristics due to the change of both $I_A$ and (a) can be compensated by installing the multiplicator 51, which provides the product of the output voltage of the power detector 49 and the rectifier 50, and the loop gain is controlled by the output product of the multiplicator 51.

As described above in detail, according to the present invention, the control signal is subject only to the amplitude change or the power change of the input high frequency signal, and that control signal is obtained after the envelope detection is performed. Therefore, the interference compensation is accomplished satisfactorily irrespective of the modulation method of both the desired signal and the undesired interference signal. Thus, PSK signal, and FM signal which are not compensated satisfactorily in a prior art are well compensated in the present invention.

Further, because of the presence of the amplitude-phase control circuit which controls both the amplitude and the phase of the interference signal, and determines not only the direction of the variable to be controlled but also the amount of the variable to be controlled at the same time, the compensation control with excellent response characteristics is achieved.

Further, the structure of the present invention is simple since a single frequency converter is enough in the present invention, although two frequency converters with the same characteristics are inevitable in a prior art.

From the foregoing, it will now be apparent that a new and improved interference signal compensation system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An interference compensation system comprising a first input terminal for receiving an interference signal $I_A$, a second input terminal for receiving a desired signal and an interference signal $I_M$, an amplitude-phase control circuit (3) for adjusting an amplitude and phase of an interference signal $I_A$ from the first input terminal so that the amplitude and the phase of the output signal $I_{VM}$ of the amplitude-phase control circuit (3) are the same amplitude and the opposite phase as compared with the interference signal $I_M$ from the second input terminal, and a combiner (4) for combining the output signal $I_{VM}$ of the amplitude-phase control circuit (3) and the signal $I_M$ from the second input terminal to provide a compensated output signal $I_E$ substantially free from an interference signal to the output terminal (15) CHARACTERIZED IN THAT:

said interference compensation system comprises;
(a) an amplitude-phase control circuit (3) comprising a pair of control signal input terminals each receiving the control signals $A+a \cdot \cos \omega t$ and $B+a \cdot \sin \omega t$, respectively, and said amplitude-phase control circuit (3) controlling the input interference signal $I_A$ so that the average length and the average direction of the output vector $I_{VM}$ is defined by the values A and B, and the head of the output vector $I_{VM}$ rotates periodically according to the values (a) and ($\omega$), where A and B change according to the difference between $I_M$ and $I_A$, and (a) and ($\omega$) are the amplitude and the angular frequency of the low frequency signal superposed on the values A and B,
(b) a low frequency oscillator (7,12) for providing a pair of outputs $a \cdot \cos \omega t$ and $a \cdot \sin \omega t$ having 90° phase difference with each other,
(c) an envelope detector (10) connected to the output of said combiner (4) to provide the envelope level of the combined signal $I_E$,
(d) means (11) connected to the output of said envelope detector to provide the low frequency component of the envelope signal,
(e) a pair of phase detectors (13a, 13b) each having two inputs, the first input of each phase detector receives the output of said means (11) in the paragraph (d), and the second input of each phase detector receives the signal having the frequency ($\omega$) with 90° phase difference with each other from said low frequency oscillator in the paragraph (b),
(f) a pair of low pass filter means (14a, 14b) each connected to the outputs of the related phase detector (13a, 13b) to prevent double frequency components ($2\omega$),
(g) a pair of voltage integrators (6a, 6b) each connected to the output of the related low pass filter means (14a, 14b) to integrate the output of the low pass filter means to provide the values A and B, respectively,
(h) a pair of adders (8a, 8b) for adding the outputs A, B of said voltage integrators (6a, 6b), and the outputs $a \cdot \cos \omega t$, $a \cdot \sin \omega t$ of said low frequency oscillator to provide $A+a \cdot \cos \omega t$, and $B+a \cdot \sin \omega t$, respectively, which are applied to the control input terminals, respectively, of said amplitude-phase control circuit (3), and
(i) a closed control loop for providing the values $A+a \cdot \cos \omega t$, and $B+a \cdot \sin \omega t$ by said combiner (4), said envelope detector (10), said means (11), said phase detectors (13a, 13b), said low pass filter means (14a, 14b), said voltage integrators (6a, 6b), said adders (8a, 8b), and said amplitude-phase control circuit (3).

2. An interference compensation system according to claim 1, further comprising means (49) for detecting power or amplitude of the first interference signal $I_A$, and variable gain control means for adjusting the gain of the closed control loop so that the higher the output of said means (49) is, the smaller the gain of the control loop is.

3. An interference compensation system according to claim 1, further comprising means for adjusting the amplitude of said low frequency oscillator is provided, and means for controlling said adjusting means according to the power at the outputs of said phase detectors, or the power or amplitude of the input of said phase detectors.

4. An interference compensation system accordiang to claim 2, further comprising a rectifier(50) for rectifying the low frequency signal applied to one of said adders, a multiplicator (51) for providing the product of the output of said rectifier and the output of said means(49), and the gain of said variable gain control means is adjusted by the output of said multiplicator.

5. An interference compensation system according to claim 1, wherein said amplitude-phase control circuit comprises;
(a) an input terminal(16),
(b) a signal divider(17) connected to said input terminal(16),
(c) a plurality of fixed phase shifters(18a,18b,18c,18d) for shifting the phase of each outputs of said signal divider (17),
(d) a plurality of variable attenuators each connected to the output of the related phase shifter,
(e) a combiner(20) for combining the outputs of said variable attenuators,
(f) an output terminal connected to the output of said combiner, a pair of control input terminals for providing the control signals to said variable attenuators.

6. An interference compensation system according to claim 1, wherein said amplitude-phase control circuit comprises;
   (a) an input terminal (16),
   (b) a signal divider(39) for dividing an input signal to two outputs,
   (c) a 90° phase shifter connected to one output of said signal divider(39),
   (d) a pair of modulators(40a, 40b) each connected to the outputs of the other output of said signal divider(39) and the output of said 90° phase shifter(41),
   (e) a combiner for combining the outputs of said modulators (40a, 40b),
   (f) an output terminal connected to the output of said combiner(42), and
   (g) a pair of control input terminals(21a, 21b) connected to the inputs of said modulators, respectively.

7. An interference compensation system according to claim 1, wherein said amplitude-phase control circuit comprises:
   (a) an input terminal,
   (b) a variable phase shifter connected to said input terminal,
   (c) a variable attenuator means connected to the output of said variable phase shifter,
   (d) an output terminal connected to the output of said variable attenuator means, and
   (e) a signal converter including a pair of control input terminals for providing the signals $S_1$ and $S_2$ to said variable attenuator means and said variable phase shifter wherein $$S_1 = \sqrt{(A + a \cdot \cos\omega t)^2 + (B + a \cdot \sin\omega t)^2}$$

-continued
$$S_2 = \tan^{-1}((B + a \cdot \sin\omega t)/(A + a \cdot \cos\omega t)),$$

where $(A+a\cdot\cos \omega t)$ and $(B+a\cdot\sin \omega t)$ are signals applied to the control input terminals.

8. An interference compensation system including a first input terminal for receiving an interference signal received from a signal source and having amplitude and phase direction and a second input terminal for receiving a desired signal and said interference signal received from said signal source, comprising:
   oscillator means for providing a first sinusoidally time varying signal and a second sinusoidally time varying signal shifted approximately ninety degrees out-of-phase with respect to said first time varying signal, first and second integrator means for respectively providing first and second D.C. voltage signals, adder means including (1) a first adder for combining said first D.C. signal and said first sinusoidally time varying signal and (2) a second adder for combining said second D.C. signal and said second sinusoidally time varying signal for providing control signals,
   an amplitude-phase control circuit connected to said adder means for receiving said control signals and said interference signal received by said first input terminal and including means for modifying the amplitude and phase direction of said interference signal received by said first terminal in accordance with said control signals and output means for providing said modified interference signal having the same amplitude but opposite in phase direction to the interference signal received by said second input terminal, and
   signal combiner means responsive to said modified interference signal provided by said amplitude-phase control circuit in combination with said interference signal received by said second input terminal for producing a combined signal substantially free from said interference signal.

* * * * *